United States Patent

Ramsay et al.

[11] 4,079,049
[45] Mar. 14, 1978

[54] TRANSITION METAL COMPLEX FORMAZAN DYESTUFFS CONTAINING AT LEAST ONE PHOSPHONIC ACID GROUP

[75] Inventors: David William Crichton Ramsay; Elliott Young, both of Manchester, England

[73] Assignee: Imperial Chemical Industries Limited, London, England

[21] Appl. No.: 682,789

[22] Filed: May 3, 1976

[30] Foreign Application Priority Data

May 28, 1975 United Kingdom .............. 23337/75

[51] Int. Cl.² .................. C09B 45/16; C09B 45/18; C09B 45/20; C09B 45/22
[52] U.S. Cl. .................................................. 260/149
[58] Field of Search ........................................ 260/149

[56] References Cited

U.S. PATENT DOCUMENTS

| 2,328,570 | 9/1943 | McNally et al. ...................... 260/196 |
| 2,662,074 | 12/1953 | Brooks ................................. 260/149 |
| 2,864,815 | 12/1958 | Ziegler ................................. 260/149 |
| 2,947,663 | 8/1960 | Losco et al. ........................ 260/205 X |
| 3,139,420 | 6/1964 | Beffa et al. .......................... 260/149 |
| 3,663,525 | 5/1972 | Witterholt et al. .................. 260/149 |
| 3,947,435 | 3/1976 | Pechmeze et al. .................. 260/190 |

Primary Examiner—Floyd D. Higel
Attorney, Agent, or Firm—Cushman, Darby & Cushman

EXEMPLARY CLAIM

1. Metal complex formazan dyestuffs which in the acid form are represented by the formula:

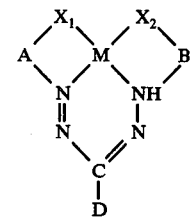

(1)

wherein A and B are each selected from phenylene, naphthalene, substituted phenylene or substituted naphthalene groups, said substituted phenylene or substituted naphthalene groups containing at least one group selected from $SO_3H$, $PO_3H_2$, $CO_2H$, CN, $NO_2$, $NH_2$, acetylamino, benzoylamino, OH, F, Cl, Br, $C_{1-4}$ alkyl, $C_{1-4}$ alkoxy, sulphonamido,

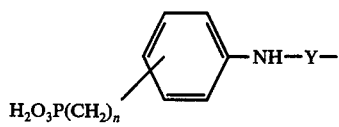

wherein Y = CO or $SO_2$ and $n=0$ or 1 or $H_2O_3P$—$CH_2CH_2$—NH—Y— wherein Y = CO or $SO_2$;

D is $NO_2$, CN, COOH, $SO_3H$, $C_{1-4}$ alkyl, $C_{1-4}$ alkyl substituted by $PO_3H_2$; $C_{1-4}$ alkenyl, styryl, pyridyl, furyl, $COCH_3$, $CO_6H_5$, naphthyl, phenyl or phenyl substituted by at least one group selected from COOH, $NH_2$, CN, F, Cl, Br, acetylamino, benzoylamino, OH, methyl, methoxy, $SO_3H$ and $PO_3H_2$;

$X^1$ and $X^2$ are both 0 or one is 0 and the other is COO; and

M is Ni, Co, Cr and Cu; at least one of A and B and D if an aliphatic or aromatic radical, bears one or more phosphonic acid groups.

The dyestuffs are useful for coloring cellulose by heating in the presence of carbodiimides.

3 Claims, No Drawings

TRANSITION METAL COMPLEX FORMAZAN DYESTUFFS CONTAINING AT LEAST ONE PHOSPHONIC ACID GROUP

This invention relates to new dyestuffs and more particularly to new dyestuffs suitable for the colouration of cellulose textile materials.

According to the present invention there are provided metal complex formazan dyestuffs which in the acid form are represented by the formula:

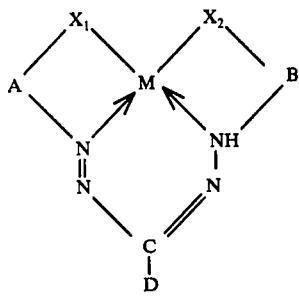
(1)

wherein A and B are aromatic radicals having $X_1$ and $X_2$ respectively linked ortho to the formazan group; D is $NO_2$, CN, $SO_3H$, $CO_2H$, an aliphatic, cycloaliphatic or aromatic radical; $X_1$ and $X_2$ are the same or different and are O, COO, S, NH, N-lower alkyl or N-phenyl; M is a transition metal; at least one of A and B and D, if an aliphatic or aromatic radical, bears one or more phosphonic acid groups.

By the term "aromatic" above we mean both homocyclic and heterocyclic aromatic radicals.

By the terms "transition metal" we mean those in the broader definition of transition metals given on page 528 of "Advanced Inorganic Chemistry" by Cotton & Wilkinson, Third Edition published by Interscience Publishers, that is any of the elements of groups IIIa, IVa, Va, VIa, VIIa, VIIIa and Ib of the Periodic Table contained in that text book.

It is preferred that M is Cu, Ni, Co or Cr and it is particularly preferred to M is Cu.

It is usually preferred that $X_1$ and $X_2$ are both O— or one is O— and the other is COO—.

The aromatic radicals A and B are the radicals of diazotisable aromatic amines and may be of the heterocyclic series e.g. furane, thiophen, pyrrole or pyridine series but are preferably of the phenyl or naphthyl series and may contain phosphonic acid groups attached directly to a carbon atom of the ring or to a substituent e.g. an alkylene radical attached to a carbon atom of the ring or an N-hydrocarbylene aminosulphonyl radical such as

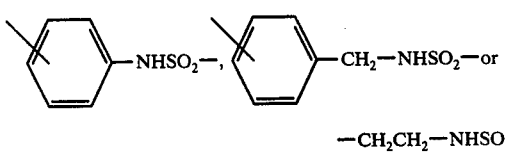

—$CH_2CH_2$—$NHSO_2$—;

or an N-hydrocarbylene aminocarbonyl radical such as

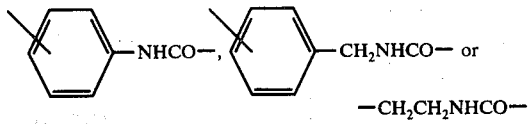

—$CH_2CH_2NHCO$— in which the $SO_2$ or CO respectively is attached to a carbon atom of the ring. The aromatic radical may carry other substituents e.g. fluorine, chlorine, bromine, lower alkyl, lower alkoxy, nitro, COOH, $SO_3H$ and acylamino, and have an ortho substituent as defined by $X_1$ or $X_2$.

The radical D may be CN, $NO_2$, $SO_3H$, COOH or the radical of the aliphatic or aromatic series often the radical of an aldehyde and is preferably the radical of the homocyclic aromatic series especially of the phenyl or naphthyl series and may contain phosphonic acid groups and other substituents as given above for A and B.

Aromatic and aliphatic radicals represented by D include alkoxycarbonyl, aryloxycarbonyl, alkylcarbonyl, arylcarbonyl, alkylsulphonyl and arylsulphonyl.

Further examples of the radicals A, B and D will be apparent from the intermediates used to prepare the dyestuffs of formula (1) detailed below.

A preferred class of dyes of formula (1) are those in which A and B are each phenylene or naphthylene groups optionally substituted by one or more groups or atoms each selected from $SO_3H$, $PO_3H_2$, $CO_2H$, CN, $NO_2$, $NH_2$, acylamino, especially acetyl- or benzoylamino, OH, F, Cl, Br, $C_{1-4}$ alkyl, $C_{1-4}$ alkoxy, sulphonamido,

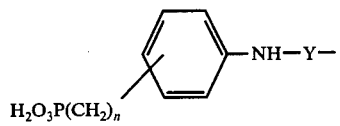

wherein Y = CO or $SO_2$ and n = 0 or 1 or $H_2O_3$P—$CH_2CH_2$—NH—Y— wherein Y = CO or $SO_2$; D is $NO_2$, CN, COOH, $SO_3H$, $C_{1-4}$ alkyl optionally substituted by $PO_3H_2$; $C_{1-4}$ alkenyl, styryl, pyridyl, furyl, $COCH_3$, $COC_6H_5$, naphthyl; or phenyl optionally substituted by one or more groups or atoms each selected from $SO_3H$, $PO_3H_2$, COOH, $NH_2$, CN, F, Cl, Br, acylamino especially acetyl- and benzoylamino, OH, methyl, methoxy;

$X^1$ and $X^2$ are both 0 or one is 0 and the other is COO; and M is Ni, Co, Cr and especially Cu.

According to a further feature of the present invention there is provided a process for the manufacture of metal complex formazan dyestuffs of the formula (1) which comprises reacting a hydrazone of the formula $$HX_2B.NH - N = C - D \qquad (2)$$

in either order or simultaneously with
(a) a diazotised aromatic amine of the formula $HX_1A.NH_2$ and
(b) a salt of metal M wherein A, B, D, M, $X_1$ and $X_2$ have the meanings hereinbefore given and at least one of A, B and D bears one or more phosphonic acid groups.

The reaction with (a) may be carried out under conditions conventionally employed for coupling reactions of diazonium compounds and hydrazones, e.g. an aqueous solution or suspension of the diazotised amine at 0°–5° C may be added to an aqueous solution or suspension of the hydrazone of formula (2) or its metal complex optionally in the presence of alkaline substances, organic solvents and/or surfactants.

The reaction with (b) may be conveniently carried out under conditions customarily used in the art for metallising metallisable organic compounds, e.g. an aqueous solution of the hydrazone of formula (2) or the formazan resulting from reaction (a) may be reacted to 0° to 5° C with a salt, e.g. acetate or sulphate of the metal M. Optionally other watermiscible solvents, e.g. ethanol or ethylene glycol, may be present and the pH is usually controlled to be from 5 to 7.

It is often preferred to simultaneously react (a) and (b) with the hydrazone of formula (2) when it is found the coupling reaction with (a) will proceed with less unwanted decomposition of the diazonium intermediate than if the reaction is carried out stepwise and this is especially true of the stepwise process in which reaction with (a) precedes (b).

The hydrazone of formula (2) may be obtained by well known means, e.g. by reducing a diazonium salt from an aromatic amine $HX_2B.NH_2$ to give the corresponding hydrazine $HX_2B.NH.NH_2$ and reacting the latter with an aldehyde of the formula D.CHO.

The diazotisation of the aromatic amine $HX_1A.NH_2$ for use as (a) in the process of the invention or of the amine $HX_2B.NH_2$ for producing the hydrazone of formula (2) can take place by any of the established methods, e.g. the amine may be reacted with sodium nitrite in acid solution at 0°–5° C.

The product of the process of the invention may be isolated in the solid form by any conventional means, e.g. spray-drying or precipitation and filtration. They may be isolated in the acid form or in the form of an ammonium salt or partly in one of these forms and partly as an alkali metal, e.g. Li, Na or K salt. These salts can be obtained by adding a halide, e.g. the chloride of the desired alkali metal or ammonium halide or ammonia to the completed reaction mixture before isolation. Alternatively, by addition of an alkanolamine, e.g. diethanolamine to the completed reaction mixture, a highly soluble form of the dyestuff is obtained which can be used as a total liquor for the dyeing or printing process.

As examples of amines $HX_1A.NH_2$ and $HX_2B.NH_2$ which may be used in, or to prepare hydrazone of formula (2) for use in, the process of the invention there may be mentioned: anthranilic acid
4-, 5- or 6-chloroanthranilic acids
4- or 5-nitroanthranilic acids
4 or 5-sulphoanthranilic acids
1-amino-2-naphthol-4-sulphonic acid
6-nitro-1-amino-2-naphthol-4-sulphonic acid
2-aminophenol
2-aminophenol-4-sulphonic acid
2-aminophenol-6-sulphonic acid
4-, 5- or 6-nitro-2-aminophenol
4- or 6-chloro-2-aminophenol
4:6-dinitro-2-aminophenol
4-chloro-2-aminophenol-6-sulphonic acid
4-methoxy-2-aminophenol
4-methyl-2-aminophenol
6-nitro-2-aminophenol-4-sulphonic acid
4-acryloylamino-2-aminophenol
4-β-chloropropionylamino-2-aminophenol
4- or 5-acryloylaminoanthranilic acid
4-acetylamino-2-aminophenol
4- or 5-acetylaminoanthranilic acid
1-amino-4-cyano-2-hydroxynaphthalene
2-aminophenol-4,6-disulphonic acid As examples of amines $HX_1A.NH_2$ and $HX_2B.NH_2$ containing phosphonic acid groups there may be mentioned:
2-aminophenol-4-phosphonic acid
6-sulpho-2-aminophenol-4-phosphonic acid
6-nitro-2-aminophenol-4-phosphonic acid
6-acetylamino-2-aminophenol-4-phosphonic acid
3-amino-4-hydroxybenzyl phosphonic acid
3- and 4(N-[3-amino-4-hydroxyphenylsulphonyl]-amino)phenyl phosphonic acids
4-(N-[3-amino-4-hydroxyphenylsulphonyl]amino)benzyl phosphonic acid
3-(N-[3-amino-4-hydroxyphenylcarbonyl]amino)phenyl phosphonic acid
N-(3-amino-4-hydroxyphenylcarbonyl)-β-aminoethane phosphonic acid
6-chloro-2-aminophenol-4-phosphonic acid
3-amino-4-carboxyphenyl phosphonic acid
3- and 4-(N-[4-amino-3-carboxyphenylsulphonyl)amino]phenyl phosphonic acids
4-(N-[4-amino-3-carboxyphenylsulphonyl)amino]benzyl phosphonic acid
N-[3-amino-4-hydroxyphenylsulphonyl]-β-aminoethane phosphonic acid
3- and 4-(N-[3-amino-4-hydroxyphenylcarbonyl]amino)benzyl phosphonic acids.

Although any of the above amines may be used as $HX_2B.NH_2$ i.e. to serve to prepare the hydrazone of formula (2) it is often preferred to use the o-carboxyamines for this purpose. Also it is often preferred to have o-hydroxyamines as $HX_1A.NH_2$.

As examples of aldehydes D.CHO which may be used to make hydrazones of formula (2) there may be mentioned:
acetaldehyde
propionaldehyde
n- and i-butyraldehyde
crotonaldehyde
cinnamaldehyde
furfuraldehyde
pyrrole-2-aldehyde
thiophen-2-aldehyde
pyridine-2-, 3- and 4-aldehydes
benzaldehyde
2- and 4-methylbenzaldehyde
m- and p-methoxybenzaldehydes
benzaldehyde-2-, 3- and 4-sulphonic and 2,4-disulphonic acids
4-amino-2-sulphobenzaldehyde
4-acetylamino-2-sulphobenzaldehyde
m- and p-acetylaminobenzaldehydes
2- and 4-chlorobenzaldehydes
2-chloro-5-sulphobenzaldehyde
2-chloro-4-, 5- and 6-nitrobenzaldehydes
2,5- and 2,6-dichloro-benzaldehydes
2,6-dichloro-3-methoxy and 3-nitrobenzaldehydes
3-methyl-2- and 6-nitrobenzaldehydes
o-, m- and p-nitrobenzaldehydes
salicylaldehyde
2,3,6-trichlorobenzaldehyde.

As examples of aldehydes D.CHO containing phosphonic acid groups there may be mentioned:
formyl methyl phosphonic acid
2-formyl ethyl phosphonic acid 3-formyl propyl phosphonic acid
2-, 3- and 4-formyl phenyl phosphonic acids.

As examples of salts which may be used for forming the metal complexes, there may be mentioned:
copper sulfate
copper acetate
nickel sulphate
chromium acetate
cobalt chloride.

According to the present invention there is provided a second process for the manufacture of metal complex formazan dyestuffs of formula (1) in which D is an alkyl or especially aryl group which comprises
(i) coupling a diazotised aromatic amine of the formula $HX_1A.NH_2$ with an α,α-substituted acylacetic ester D.CH(Acyl).COOR
(ii) hydrolysing the product of (i) with alkali and
(iii) reacting the product of (ii) in either order or simultaneously with (a) a diazotised aromatic amine $HX_2.B.NH_2$
(b) a salt of the metal M
wherein R is an alkyl group and A, B, D, M, $X_1$ and $X_2$ have the meanings hereinbefore given and at least one of A, B and D bears one or more phosphonic acid groups.

It should be noted this reaction proceeds with the elimination from the α,α substituted acyl acetic ester of the COOR group at stage (ii) and of the acyl group when reacted with (a).

The conditions for stage (i) and reaction with (a) and (b) are similar to those given above in connection with the coupling and metallisation of first process of the present invention.

The hydrolysis stage (ii) may conveniently be carried out by heating in aqueous solution at from 85 to 100° C in the presence of alkali e.g. sodium carbonate, sodium hydroxide.

As examples of the amines $HX_1A.NH_2$ and $HX_2B.NH_2$ and of salts of the metal M which may be used there may be mentioned any of those given above in connection with the first process of the present invention.

As examples of α,α substituted acyl acetic esters there may be mentioned:
α-phenyl-α-formyl acetic acid ethyl ester According to the present invention there is provided a third process for the manufacture of metallised formazan dyestuffs of formula (1) which comprises:
(1) reacting a compound containing an active methylene group with a diazotised aromatic amine $HX_1A.NH_2$
(2) in the case of those active methylene compounds having an alkoxy carbonyl group hydrolysing the product of (1) and
(3) reacting the product of (1), or of (2) when applicable, in either order or simultaneously with
(a) a diazotised aromatic amine $HX_2B.NH_2$
(b) a salt of the metal M.

This third process is clearly closely related to the second process and generally similar conditions are appropriate for it and the same examples of amines $HX_1A.NH_2$ and $HX_2B.NH_2$ and salts of the metal M are also appropriate for the third process.

As examples of active methylene compounds containing an alkoxycarbonyl group and thus requiring stage 2 in the above third process (at which stage the alkoxycarbonyl group is displaced) there may be mentioned: acetoacetic esters such as ethyl acetoacetate; benzoyl acetic esters such as ethyl benzoylacetate; oxalacetic esters such as ethyl oxaloacetic ester; malonic acid esters such as diethyl malonate and cyano acetic esters such as ethyl cyanoacetate.

As examples of active methylene compounds not containing an alkoxycarbonyl group and thus not requiring stage 2 of the above third process there may be mentioned:
nitroalkanes such as nitromethane and α-carbonylalkanes such as
acetone
methylethylketone
acetophenone
ω-chloracetophenones
ω-nitroacetophenone
acetone monosulphonic acid.

With some compounds such as acetone monosulphonic acid some doubt exists as to the position of coupling and of the nature of the group concurrently eliminated, thus, for example, it is not certain when acetone monosulphonic acid is used if dyestuffs of formula (1) in which D is $SO_3H$ are produced or dyestuffs in which D is $COCH_2SO_3H$ or mixtures of both these types of structures.

The new dyestuffs are soluble in water owing to the presence of phosphonic acid groups. In many cases, there may also be sulphonic acid groups present to increase their solubility. They can be used, in general, for the colouration of textile materials which can be dyed by dyes solubilised by anionic groups, e.g. natural and synthetic polyamide materials, e.g. wool, silk, polyhexamethylene adipamide and polycaproimide, but more especially natural or regenerated cellulose textile materials, e.g. cotton, linen and viscose rayon; in the case of cellulose textile materials, they are preferably fixed on the fiber by baking at a temperature of from 95° to 205° C in the presence of a carbodiimide e.g. cyanmide, dicyandiamide, e.g. by the method described in German OLS 2,324,809.

Textiles coloured by dyes of the present invention show good fastness to washing treatments.

The dyes of the present invention are particularly suitable for application together with disperse dyestuffs from a single dyebath or print paste and in this respect compare favourably with, for example, most conventional cellulose reactive dyes which require the presence of alkaline adjuncts that frequently lead to flocculation of the disperse dyestuff. Such mixed dyebaths or print pastes are frequently desirable when colouring textile materials containing two types of fibre e.g. cellulose and polyester blends.

The invention is illustrated by the following Example in which parts are by weight:

EXAMPLE 1

Prepartion of:

-continued

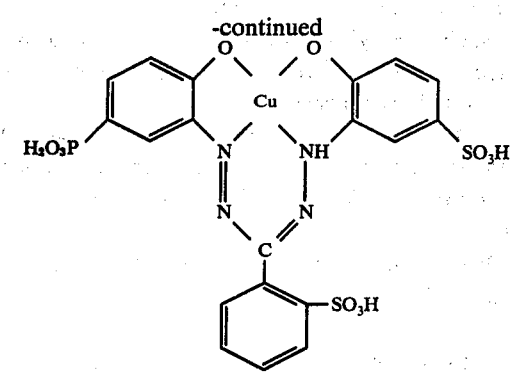

24 parts of 5-sulpho-2-hydroxyphenylhydrazine hydrochloride are stirred into 200 parts of water and the pH adjusted to 5 by the addition of concentrated ammonia solution. 18.6 parts of 2-sulphobenzaldehyde (free acid) are then added portionwise maintaining the mixture at pH 5. After 2 hours the suspension is cooled to below 5° C and 23.65 parts of the diazonium salt from 2-aminophenol-4-phosphonic acid in 100 parts of water are added, followed by 25 parts of copper sulphate whilst maintaining at pH 5. After 6 hours product formation is essentially complete and the pH is raised to 10 by the addition of concentrated ammonia liquor and after 1 hour lowered to 7 by conventional hydrochloric acid addition. Isolation is effected by drowning into a large volume of acetone, filtering off and drying to give 52 parts of the desired product which dyed cellulose fibers by the methods of German OLS No. 2,324,809 in bright reddish-blue shades of excellent fastness properties.

Preparation of:

-continued

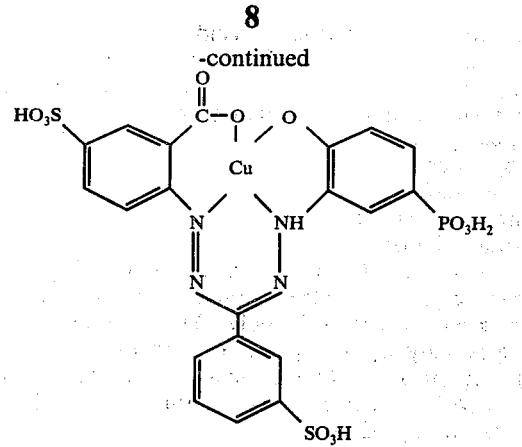

26.85 parts of 4-sulpho-2-carboxylic acid phenyl hydrazine hydrochloride are stirred into 200 parts of water and the pH adjusted to 5 by the addition of concentrated ammonia solution. 18.6 parts of 3-sulphobenzaldehyde (free acid) are then added portionwise maintaining the mixture at pH 5. After 2 hours the suspension is cooled to below 5° C and 23.65 parts of the diazonium salt from 2-aminophenol-4-phosphonic acid in 100 parts of water are added followed by 25 parts of copper sulphate whilst maintaining at pH 6.5 to 7. After 2 hours product formation is complete, the pH is lowered to 2 and, after salting to the appropriate level with ammonium chloride, the mixture is filtered and the cake dried to yield 65 gm of the above product which dyed cellulose fibers by the methods of German OLS No. 2,324,809 in bright blue shades of excellent fastness properties.

By using the method of Examples 1 or 2 as appropriate and indicated in the following table with the hydrazine, diazonium salt, aldehyde and sulphate of the metal given in columns III, IV, V and VI of the table in place of the corresponding hydrazine, diazonium salt, aldehyde and copper sulphate of those examples dyes were obtained of related structure which colored cellulose by the methods of German OLS No. 2,324,809 to the shade given in column VII of the table, the dyed fibres having excellent fastness properties.

| I Example | II Method as in Example | III Hydrazine | IV Diazonium salt from | V Aldehyde | VI Metal | VII Shade |
|---|---|---|---|---|---|---|
| 3 | 1 | 2-hydroxy-3-nitro-5-sulphophenylhydrazine | 2-aminophenol-4-phosphonic acid | 4-acetylamino benzaldehyde | Cu | Green |
| 4 | 1 | 2-hydroxy-5-sulphophenyl hydrazine | " | 4-sulpho-benzaldehyde | Cu | Greenish-blue |
| 5 | 2 | 2-carboxy-4-sulphophenyl hydrazine | " | 4-acetylamino benzaldehyde | Cu | Bluish-green |
| 6 | 1 | 2-hydroxy-3-nitro-5-sulphophenylhydrazine | " | 3-sulpho-benzaldehyde | Cu | " |
| 7 | 1 | 2-hydroxy-5-chloro-phenyl hydrazine | " | benzaldehyde-2,4-disulphonic acid | Cu | Reddish-blue |
| 8 | 1 | 2-hydroxy-5-sulpho-phenyl hydrazine | 3-(N-[3'-amino-4'-hydroxyphenyl sulphonyl]amino) phenyl phosphonic acid | benzaldehyde-3-sulphonic acid | Cu | Blue |
| 9 | 2 | 3-(N-['-hydrazino-4'-carboxyphenylsulphonyl) amino]phenyl phosphonic acid | 4-acetylamino-2-aminophenol-6-sulphonic acid | benzaldehyde-2-sulphonic acid | Cu | Reddish-blue |
| 10 | 1 | 2-hydroxy-5-sulpho-phenyl hydrazine | N-(3-amino-4-hydroxy phenylsulphonyl)-β-aminoethane phosphonic acid | benzaldehyde-4-sulphonic acid | Cu | Greenish-blue |
| 11 | 2 | 4-(N-[3'-carboxy-4'-hydrazinophenylsulphonyl) amino]benzyl phosphonic acid | 1-amino-2-naphthol-4-sulphonic acid | 2-chloro-5-sulpho benzaldehyde | Cu | Greenish blue |

-continued

| I Example | II Method as in Example | III Hydrazine | IV Diazonium salt from | V Aldehyde | VI Metal | VII Shade |
|---|---|---|---|---|---|---|
| 12 | 1 | 2-hydroxy-3,5-disulpho-phenyl hydrazine | 3-(N-[3'-amino-4'-hydroxyphenylcarbonyl]amino)phenyl phosphonic acid | 4-methoxy benzaldehyde | Cu | Blue |
| 13 | 2 | 2-carboxy-4-acetylamino-phenyl hydrazine | 2-aminophenol-4-sulphonic acid | 3-formylphenyl phosphonic acid | Cu | Greenish-blue |
| 14 | 1 | 2-hydroxy-3,5-disulpho-phenyl hydrazine | 4-(N-[3'-amino-4'-hydroxyphenyl sulphonyl]amino) benzyl phosphonic acid | 3-nitro benzaldehyde | Cu | " |
| 15 | 1 | 2-hydroxy-5-sulpho-phenyl hydrazine | 2-aminophenol-4-phosphonic acid | acetaldehyde | Cu | Blue |
| 16 | 1 | 3-hydrazino-4-hydroxy-phenyl phosphonic acid | 6-methoxy-2-amino-phenol-4-sulphonic acid | furfuraldehyde | Cu | " |
| 17 | 2 | 3-hydrazino-4-carboxy-phenyl phosphonic acid | 4-bromo-2-aminophenol | cinnamaldehyde | Cu | Bluish-green |
| 18 | 2 | " | 4-sulphonamido-2-aminophenol | 4-acetylamino-2-sulpho benzaldehyde | Cu | Greenish-blue |
| 19 | 1 | 3-hydrazino-4-hydroxy phenyl phosphonic acid | 6-nitro-2-aminophenol 4-sulphonic acid | o-chloro benzaldehyde | Ni | Dull red |
| 20 | 2 | 3-hydrazino-4-carboxy phenyl phosphonic acid | 2-aminophenol | pyridine-2-aldehyde | Cu | Blue |
| 21 | 2 | 2-carboxy-5-chloro phenyl hydrazine | 6-nitro-1-amino-2-naphthol-4-sulphonic acid | formylmethyl phosphonic acid | Cu | Bluish-green |
| 22 | 2 | 2-carboxyphenyl hydrazine aminophenol | 4-methyl-2-phosphonic acid | 4-formylphenyl | Cu | Blue |
| 23 | 1 | 2-hydroxy-4-methoxy phenyl hydrazine | 6-sulpho-2-amino-phenol-4-phosphonic acid | crotonaldehyde | Cu | " |
| 24 | 1 | 2-hydroxy-5-sulpho phenyl hydrazine | 3-amino-4-hydroxy benzyl phosphonic | 2-methyl benzaldehyde | Cu | Reddish-blue |
| 25 | 1 | " | N-(3'-amino-4'-hydroxyphenylcarbonyl β-aminoethane | 3-formylphenyl phosphonic acid | Cu | Blue |
| 26 | 1 | 2-hydroxy-3-nitro-5-sulphophenyl hydrazine | 6-benzoylamino-2-aminophenol-4-sulphonic acid | 2-formylphenyl phosphonic acid | Cu | Bluish-green |
| 27 | 1 | 3-hydrazino-4-hydroxy phenyl phosphonic acid | 2-aminophenol-4-sulphonic acid | 4-formylphenyl phosphonic acid | Cu | Blue |
| 28 | 1 | 3-(N-[3-hydrazino-4-hydroxyphenylcarbonyl]amino)phenyl phosphonic acid | 4-acetylamino-2-aminophenol | benzaldehyde-2-sulphonic acid | Cu | Reddish-blue |
| 29 | 1 | 2-hydroxy-3,5-disulpho phenyl hydrazine | 4-(N-[3-amino-4-hydroxyphenylcarbonyl]amino)benzyl phosphonic acid | propionaldehyde | Cu | Blue |
| 30 | 1 | 2-hydroxy-5-sulpho | 6-nitro-2-aminophenol-4-phosphonic acid | salicylaldehyde | Cu | Greenish-blue |
| 31 | 2 | 2-carboxy-4-nitro phenyl hydrazine | 6-acetylamino-2-aminophenol-4-phosphonic acid | benzaldehyde-2-sulphonic acid | Cu | Reddish-blue |
| 32 | 1 | 2-hydroxy-5-sulpho phenyl hydrazine | 2-aminophenol-4-phosphonic acid | benzaldehyde-4-sulphonic acid | Ni | Dull red |
| 33 | 2 | 2-carboxy-4-sulpho phenyl hydrazine | " | benzaldehyde-3-sulphonic acid | Co | Green |
| 34 | 1 | 2-hydroxy-5-sulpho phenyl hydrazine | 3-(N-[3-amino-4-hydroxyphenyl sulphonyl]amino) phenyl phosphonic acid | benzaldehyde-4-sulphonic acid | Cr | " |
| 35 | 2 | 2-carboxy-4-sulpho phenyl hydrazine | 2-aminophenol-4-sulphonic acid | 4-formyl phenyl phosphonic acid | Ni | Dull red |
| 36 | 2 | 2-hydrazinoterephthalic acid | 2-aminophenol-4-phosphonic acid | benzaldehyde | Cu | Blue |
| 37 | 2 | 2-carboxy-4-sulpho phenyl hydrazine | 6-chloro-2-amino-phenol-4-phosphonic acid | 4-formylphenyl phosphonic acid | Cu | " |
| 38 | 2 | 3-(N-[3'-carboxy-4-hydrazinophenyl sulphonyl]amino)phenyl phosphonic acid | 4,6-dinitro-2-aminophenol | 2-naphthaldehyde | Cu | " |
| 39 | 2 | 2-carboxy-5-acetylamino-phenyl hydrazine (hydrolysed after formazan formation) | 2-aminophenol-4-phosphonic acid | benzaldehyde-2-sulphonic acid | Cu | " |
| 40 | 1 | 3-hydrazino-4-hydroxy phenyl phosphonic acid | 1-amino-4-cyano-2-hydroxynaphthalene | 4-acetylamino benzaldehyde (hydrolysed after formazan formation) | Cu | Green |
| 41 | 1 | 2-hydroxy-5-sulpho phenyl hydrazine | 2,5-dihydroxy-3-aminophenyl sulphonic acid | 3-formylphenyl phosphonic acid | Cu | Blue |
| 42 | 1 | 2-hydroxy-5-n-butyl phenyl hydrazine | 2-aminophenol-4,6-disulphonic acid | 4-formylphenyl phosphonic acid | Cu | Blue |

| I Example | II Method as in Example | III Hydrazine | IV Diazonium salt from | V Aldehyde | VI Metal | VII Shade |
|---|---|---|---|---|---|---|
| 43 | 1 | 2-hydroxy-5-fluoro phenyl hydrazine | 2-aminophenol-4-phosphonic acid | 4-acetylamino benzaldehyde | Cu | Greenish-blue |
| 44 | 2 | 2-carboxy-4-sulpho phenyl hydrazine | 4-ethyl-2-aminophenol | 3-formylpropyl phosphonic acid | Cu | Blue |
| 45 | 1 | 2-hydroxy-4-ethoxy phenyl hydrazine | 4-butoxy-2-amino phenol | " | Cu | " |
| 46 | 1 | 2-hydroxy-4-sulpho-6-acetylaminophenyl hydrazine | 6-benzoylamino-2-aminophenol-4-sulphonic acid | 4-formylphenyl phosphonic acid | Cu | " |
| 47 | 1 | 2-hydroxy-5-sulpho phenyl hydrazine | N-(3'-amino-4'-hydroxyphenyl sulphonyl)-β-aminoethane phosphonic acid | benzaldehyde-2-sulphonic acid | Cu | " |

EXAMPLE 48

Preparation of:

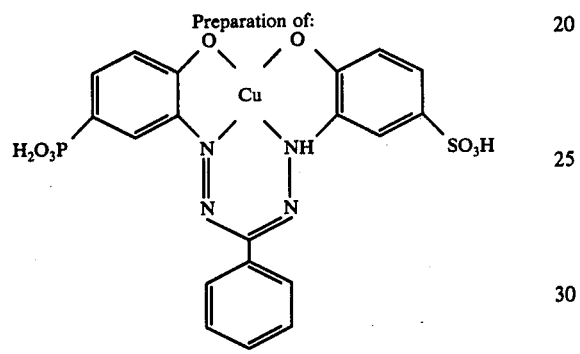

23.65 parts of the diazonium salt from 2-aminophenol-4-phosphonic acid in 100 parts of water are added to a mixture of 20.5 parts of phenyl formyl acetic acid ethyl ester, 200 parts of dioxan maintaining at pH 8.5–9. After 6 hours coupling is essentially complete and 8 parts of sodium hydroxide are added and the temperature raised to 90°–95° C for ½ hour. After cooling to below 5° C and neutralising with acetic acid, 23.65 parts of the diazonium salt from 2-aminophenol-4-sulphonic acid in 100 parts of water are added followed by 25 parts of copper sulphate whilst maintaining at pH 6–7. After 1 hour the pH is lowered to 2 for 1 hour, raised by concentrated ammonia liquor to 10 for 1 hour and finally lowered to 7 by addition of concentrated hydrochloric acid. Isolation is effected by salting with ammonium chloride, filtering off and drying to give 46 parts of the desired product which dyed cellulose fibers by the method of German OLS No. 2,324,809 in bright blue shades of excellent fastness properties.

EXAMPLES 49 and 50

Following the procedure of Example 48 replacing the diazonium salt of 2-aminophenol-4-phosphonic acid with an equivalent amount of that from 3-carboxy-4-aminophenyl sulphonic acid gave a dyestuff which coloured cellulose a similar shade (Example 49). A further preparation replacing the diazonium salt of 2-aminophenol-4-phosphonic acid with an equivalent amount of that from 6-nitro-2-aminophenol-4-sulphonic acid gave a dye which coloured cellulose a greenish blue (Example 50)

EXAMPLE 51

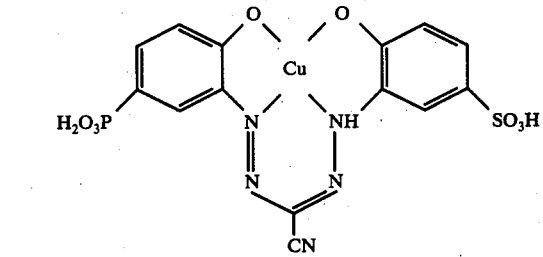

23.65 parts of the diazonium salt from 2-amino phenol-4-phosphonic acid in 100 parts of water are added to a mixture of 11.3 parts of ethyl cyano acetate and 50 parts of water at below 5° C whilst maintaining at pH 6–7 by the addition of concentrated ammonia liquor. After 1 hour sodium hydroxide (4% w/v) is added and the whole raised to 50° C and held 2 hours. On cooling to below 5° C, 23.65 parts of the diazonium salt of 2-aminophenol-4-sulphonic acid in 100 parts of water are added whilst maintaining at pH 12–12.5. After 4 hours coupling is essentially complete and, after neutralisation, 25 parts of copper sulphate are added at pH 6–7 and after 1 hour isolation is effected by salting to the appropriate level with ammonium chloride, filtering off and drying to give 38 parts of the desired product which dyed cellulose fibres by the method of German OLS No. 2,324,809 in bright blue shades of excellent fastness properties.

Following the procedure of Example 51 (omitting the heating with sodium hydroxide in those cases where the active methylene compound does not contain an alkoxy carbonyl group) replacing the diazonium salts with equivalent amounts of diazonium salts from amines as specified in columns II and IV of the table and replacing the ethyl cyanoacetate with an equivalent amount of an active methylene compound given in column III of the table there are obtained dyestuffs which dye cellulose the shade given in column V when applied by the method of German OLS 2,324,809.

| I Example | II First diazonium salt from | III Active methylene compound | IV Second diazonium salt from | V Shade |
|---|---|---|---|---|
| 52 | 3-amino-4-carboxy-phenyl sulphonic acid | ethyl acetoacetate | 2-aminophenol-4-phosphonic acid | Blue |
| 53 | 6-acetylamino-2-amino- | ethyl benzoylacetate | 6-nitro-2-aminophenol- | Greenish- |

-continued

| Example | II First diazonium salt from | III Active methylene compound | IV Second diazonium salt from | V Shade |
|---|---|---|---|---|
| 54 | phenol-4-sulphonic acid 6-nitro-2-aminophenol-4-phosphonic acid | nitromethane | 4-phosphonic acid 6-nitro-2-aminophenol-4-sulphonic acid | blue Bluish-green |
| 55 | 6-chloro-2-aminophenol-4-sulphonic acid | acetophenone | 2-aminophenol-4-phosphonic acid | Blue |
| 56 | 3-carboxy-4-aminophenyl sulphonic acid | diethyl malonate | 2-aminophenol-4-phosphonic acid | Blue |
| 57 | " | ethylcyanoacetate | " | " |
| 58 | 2-aminophenol-4-phosphonic acid | acetone monosulphonic acid | 2-aminophenol-4-sulphonic acid | " |

We claim:
1. A metal complex formazan dyestuff in which the acid form is of the formula:

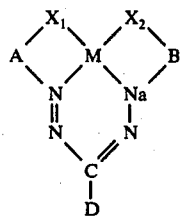

wherein A and B are each selected from phenylene, naphthalene, or phenylene or naphthalene substituted by one or more groups selected from SO$_3$H, PO$_3$H$_2$, CO$_2$H, CN, NO$_2$, NH$_2$, acetylamino, benzoylamido, OH, F, Cl, Br, C$_{1-4}$ alkyl, C$_{1-4}$ alkoxy, sulphonamido,

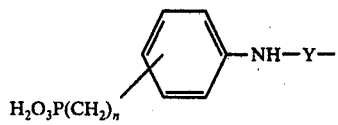

wherein Y = CO or SO$_2$ and n = 0 or 1 and H$_2$O$_3$P—CH$_2$CH$_2$—NH—Y wherein Y = CO or SO$_2$;

D is NO$_2$, CN, COOH, SO$_3$H, C$_{1-4}$ alkyl, C$_{1-4}$ alkyl substituted by PO$_3$H$_2$; C$_{1-4}$ alkenyl, styryl, pyridyl, furyl, COCH$_3$, CO$_6$H$_5$, naphthyl, phenyl or phenyl substituted by one or more groups selected from COOH, NH$_2$, CN, F, Cl, Br, acetylamino, benzoylamino OH, methyl, methoxy, SO$_3$H and PO$_3$H$_2$;

X$_1$ and X$_2$ are both 0 or one is 0 and the other is COOH; and M is Ni, Co, Cr or Cu; at least one of A and B and D, if an aliphatic or aromatic radical, bears one or more phosphonic acid groups.

2. A dyestuff as claimed in claim 1 wherein M is Cu.
3. A dyestuff as claimed in claim 2 of the formula:

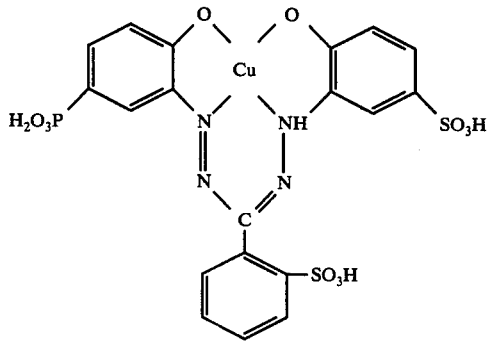

* * * * *